United States Patent [19]
Halbert et al.

[11] Patent Number: 6,101,484
[45] Date of Patent: Aug. 8, 2000

[54] DYNAMIC MARKET EQUILIBRIUM MANAGEMENT SYSTEM, PROCESS AND ARTICLE OF MANUFACTURE

[75] Inventors: Richard V. Halbert, Redmond; Niklas Gustafsson, Bellevue; John M. Thrun, Redmond, all of Wash.

[73] Assignee: Mercata, Inc., Bellevue, Wash.

[21] Appl. No.: 09/281,859

[22] Filed: Mar. 31, 1999

[51] Int. Cl.[7] .................................................. G06F 17/60
[52] U.S. Cl. ................................................ 705/26; 705/35
[58] Field of Search ......................................... 705/26, 35

[56] References Cited

U.S. PATENT DOCUMENTS

| | | |
|---|---|---|
| 3,581,072 | 5/1971 | Nymeyer . |
| 4,567,359 | 1/1986 | Lockwood . |
| 4,789,928 | 12/1988 | Fujisaki . |
| 4,949,248 | 8/1990 | Caro . |
| 5,148,365 | 9/1992 | Dembo .................................... 364/402 |
| 5,255,184 | 10/1993 | Hornick et al. ......................... 364/407 |
| 5,270,921 | 12/1993 | Hornick ................................... 364/407 |
| 5,377,095 | 12/1994 | Maeda et al. . |
| 5,576,951 | 11/1996 | Lockwood . |

(List continued on next page.)

FOREIGN PATENT DOCUMENTS

WO 00/11570  3/2000  WIPO ............................. G06F 17/00

OTHER PUBLICATIONS

Woolcott Search Report.
Online Document from Software Patent Institute Database of Software Technology, http://m.spi.org/, Record 1: "Management Data Processing," Serial No. acmr6512.0039, Printed Sep. 20, 1999.
Online Document from Software Patent Institute Database of Software Technology, http://m.spi.org/, Record 2: "Management Science," Serial No. ACMGCL89.1066, Printed Sep. 20, 1999.
Dialog, "New Tricks in Pet Supplies"by Minkoff, J., Discount Merchandiser, 34(12)70–72, 1994.
Online Document from Software Patent Institute Database of Software Technology, http://m.spi.org/, Record 17: "Distribution Resource Planning," Serial No. HPAPPS.2620, Printed Sep. 20, 1999.
IBM Technical Disclosure Bulletin, "Multi–Product Delivery System Optimization Procedure," 38(4):502–503, Apr. 1995.
Online Document from Cooperative Educational Service Agency, http://www.cesa5.k12.wi.us/buying.htm, Printed Sep. 20, 1999.
Online Document from OCM, http://www.cynric.org/OCM/administration/management/services/coop.html, Printed Sep. 20, 1999.

(List continued on next page.)

*Primary Examiner*—Edward R. Cosimano
*Assistant Examiner*—Phillip Groutt
*Attorney, Agent, or Firm*—Cooley Godward LLP

[57] ABSTRACT

A dynamic market equilibrium management system is especially adapted for the sale of goods and services through an online buying group (referred to herein as a "co-op') formed for the specific purpose of purchasing a particular product at (102) by defining a start time, end time, critical mass, any minimum number of units offered, any maximum number of units offered, starting price and product cost curve. As data is gathered from buyers, by means of their making binding purchase offers, the co-op is modified at (108) using the market equilibrium manager, so as to take into account market forces such as supply and demand for the item to be sold and their interrelationship with the purchase price for such item. When used with the online buying group, the dynamic market equilibrium management system permits dynamic, real time yield management decisions based on true market data. A graphical user interface receives user inputs for directly manipulating graphical display of data from a database on a display device and displays feedback dependent variable data on the display device, such as in the form of a changed numerical value in response to the user moving at least one data point in the graphical display.

25 Claims, 9 Drawing Sheets

U.S. PATENT DOCUMENTS

| | | |
|---|---|---|
| 5,640,569 | 6/1997 | Miller et al. . |
| 5,712,985 | 1/1998 | Lee et al. . |
| 5,724,521 | 3/1998 | Dedrick . |
| 5,727,165 | 3/1998 | Ordish et al. ............................. 705/37 |
| 5,729,700 | 3/1998 | Melnikoff ................................ 395/236 |
| 5,745,882 | 4/1998 | Bixler et al. . |
| 5,758,327 | 5/1998 | Gardner et al. . |
| 5,758,328 | 5/1998 | Giovannoli . |
| 5,765,143 | 6/1998 | Sheldon et al. . |
| 5,794,207 | 8/1998 | Walker et al. .............................. 705/1 |
| 5,794,219 | 8/1998 | Brown . |
| 5,797,127 | 8/1998 | Walker et al. . |
| 5,799,284 | 8/1998 | Bourquin .................................. 705/26 |
| 5,806,047 | 9/1998 | Hackel et al. . |
| 5,809,144 | 9/1998 | Sirbu et al. . |
| 5,819,914 | 10/1998 | Fujisaki . |
| 5,826,244 | 10/1998 | Huberman . |
| 5,832,489 | 11/1998 | Cameron et al. . |
| 5,835,896 | 11/1998 | Fisher et al. ............................. 705/37 |
| 5,842,178 | 11/1998 | Giovannoli . |
| 5,845,265 | 12/1998 | Woolston . |
| 5,845,266 | 12/1998 | Lupien et al. . |
| 5,890,137 | 3/1999 | Koreeda .................................... 705/26 |
| 5,890,138 | 3/1999 | Godin et al. . |
| 5,895,454 | 4/1999 | Greef et al. . |
| 5,913,210 | 6/1999 | Call ............................................ 707/4 |
| 5,915,209 | 6/1999 | Lawrence . |
| 5,956,709 | 9/1999 | Xue . |
| 5,983,199 | 11/1999 | Kaneko . |
| 6,000,826 | 12/1999 | Parunak et al. ......................... 364/148 |

OTHER PUBLICATIONS

Online Document from Franklin Regional Council Governments, http://www.frocg.or/purch.html, Printed Sep. 20, 1999.

Dialog, The Gale Group Newsletter, "New Twist to Online Shopping: Service Hopes to Break Customer Apathy," Internet Week, 1(7), May 22, 1995.

Dialog, The Gale Group Newsletter, "In Year 2020, Auctions and Agents to Rule Web," Newsbytes,Mar. 23, 1998.

Online Document from IBM Intellectual Property Network, http://www.patents.ibm.com/, Titled: Personalized optimized Decison/Transaction Program, Jan. 1995, Reprinted Nov. 24, 1999.

Online Document from Agorics, Inc., http://www.agorics.com/, Sections: "A Survey of Auctions," English Auction, A Dutch Auction, The First Price Auction, The Vickrey Auction, The Double Auction, Auction Offshoots, Auction Strategies Auction Histories Government Securities—Auctioned Off, Collusion in Auctions, Auction Bibliography, Dated 1996, Reprinted Oct. 25, 1999.

Online Document from Forbes.com,http://222.forbes.com, Forbes Global Computer Science Section of Dec. 28, 1998, "Coming Soon–Cyber Co–ops" by Karlgaard, Printed Nov. 16, 1999.

Management and Specialist Team, LetsBuyIt.com, http://www.euroferret.com, Jan. 15, 1999; Online Document, http://www.alumni.se/e–commerce/default.htm, Jan. 15, 1999, Printed Nov. 19, 1999.

Online Document from Bid.com, http://www.bid.com/dutch, Printed Sep. 3, 1999.

Online Document from Bullnet Online Auctions, http://www.bullnet.co.uk/auctions/info.htm, Printed Sep. 3, 1999.

Online Document from Who's Who for The Commerce Standard, http://www.gii.com/standard/who/indes.html. Printed Noc. 19, 1999.

Online Document from Klik–Klok Online Dutch Auction, http://www.klik–klok.com/how.htm, Printed Sep. 3, 1999.

Online Document, ComputerSweden, "Icon–grundaresatsar nähalv miljard påe–handel," http://nygeter.idg.se, Jan. 23, 1999 (w/English translation).

Online Document from Artiklar fråan AffärsData ("Resumé"), http://www.ad.se, Feb. 25, 1999 (w/English translation).

Online Document from ComputerSweden, "Kjell Spångberg . . . ," http:..nyheter.idg.se, Mar. 3, 1999 (with English Translation).

Online Document from Accompany: About Team http:..www.accompany.com/about_press_0.asp, Printed Mar. 3, 1999.

Online Document from Accompany: About Team, http:..www.accompany.com/about_team.asp, Printed Mar. 3, 1999.

Online Document from Accompany: About Team Advisors, http:..www.accompany.com/ablut_team_advisors.asp, Printed Mar. 3, 1999.

Online Document from Accompany: About Team, http://www.accompany.com/about_press_analyst.asp, Printed Mar. 3, 1999.

Online Document from Accompany: Contact, http:..www.accompany.com/about_contact.asp, Printed Mar. 3, 1999.

Online Document from Ask Reggie Domain Search, Accompany.com Domain contacts, http:..www.askreggie.com, Printed Mar. 3, 1999.

Online Document from Accompany: About US, http:..www.accompany.com/about_press_background.asp, Printed Mar. 3, 1999.

Online Document from ZDNN, http:..www.zdent.com/stories/news, Printed Mar. 3, 1999.

NewsAlert, "Accompany, Inc. to Revolutionize Commerce; Buys Come Together for Best Value,"http://www.accompany.com, Printed Mar. 3, 1999.

Online Document from Yahoo, "Web startup pushes volume shopping," http://dailynews.yahoo.com, Printed Mar. 4, 1999.

Online Document from Dagens Industri, "Rush into Net–shopping,"http://www.ki.se/Scripts/, Documnent dated Mar. 12, 1999, Printed Jan. 19, 2000 (with English Translation).

Online Document, "US–Il–Chicago–Cargo Revenue Management Analyst," Analyst, US–IL–Chicago—Revenue Manager, US–IN–Indianapolis—Yield Analyst, US–CA–San Jose—Finicial Analyst, http://jobsearch.monster.com, Printed Mar. 24, 1999.

Online Document from hotjobs.com, "Filenet Corporation," http://www.hotjobs.com, Printed Mar. 24, 1999.

Online Document from The Revenue Management Home Page, "Revenue Management Defined," wysiwyg:..212/http//www.geocites.com/WallStreet/Floor/4921/, Printed Mar. 18, 1999.

Online Document from The Revenue Management Home Page, "Articles on Revenue Management," wysiwyg:..212/http:..www.geocites.com/WallStreet/Floor/4921/articles.htm, Printed Mar. 18, 1999.

Online Document from The Revenue Management Home Page, "Companies Practicing Revenue Management," wysiwyg://212/http://www.geocites.com/WallStreet/Floor/4921/rmcomps.htm, Printed Mar. 18, 1999.

Online Document from Revenue Management Systems, Inc., "What is Revenue Management?" http:..www.revenue-management.com/whatisrm.htm, Printed Mar. 19, 1999.

Online Document from profitoptim.com, "Definition of Revenue Management," http://www.profitoptim.com/papersdirectory/rmdaybrief/sld063.htm, Printed Mar. 19, 1999.

Online Document from profitoptim.com, "What is Revenue Management (cont.)?" http://www.profitoptim.com/papers-directory/resexpo97/sld006.htm, Printed Mar. 19, 1999.

Online Document from American Way, "How Airline Pricing Works," http://www.aa.com/away/Vantage/vantage–may98.htm, Printed Mar. 18, 1999.

Online Document from Airline Discount, http://faculty.darden.edu/pfeiferp/airline.htm, Printed Mar. 18, 1999.

Online Document from The Innovation Network, "1994 Innovation Collection," http://198.49.220.47/texis/si/sc/i . . . e/+KoeMUi3WwBme+It0X0www/full.html, Printed Mar. 19, 1999.

Online Article by W. Lieberman of Veritec Solutions, Inc., "Yield Management: System or Program?" http://www.veritecsolutions.com, Site visited on Mar. 19, 1999.

Online Article by W. Lieberman of Veritec Solutions, Inc., "Making Yield Management Work for You: Ten Steps to Enhanced Revenues," http://www.veritecsolutions.com, Site visited on Mar. 19, 1999.

Online Article by W. Lieberman of Veritec Solutions, Inc., "Debunking the Myths of Yield Management" http://www.veritecsolutions.com, Site visited on Mar. 19, 1999.

Online Document from StoreSearch Internet Shopping Guide, http://www.storesearch.com/, Site visited on Aug. 31, 1999.

Online Document from Netscape Netcenter, http://hsop.netscape.com/auctions/main.adp, Site visited on Aug. 31, 1999.

Online Document from Yahoo! Auctions, http://auctions.yahoo.com/, Site visited on Aug. 31, 1999.

Online Document from Lycos: Sales & Specials, http://www.lycos.com/Shopping/sales_and specoals/, Sited visited on Aug. 31, 1999.

Hutchinson, "E–Commerce: Building a Model," Communications Week, pp. 57–60, Mar. 17, 1997.

M2 Communications, "Iceentral Inc: Web Retailers Band Together to Build Trasffic and Sales," M2 Presswire, Feb. 25, 1997.

Berryman et al., "Electronic commerce: Three Emerging Strategies," McKinsey Quarterly, No. 1, pp. 152–159, 1998.

"BuyItOnline Revolutionizes Internet Retailing for Small Business Merchants," Business Wire, Sep. 8, 1998.

Abstract, World Reporter, Dagens Industri, "Expected success for internet shopping,"WL 5900897, Mar. 12, 1999.

U.S. Application No. 60/119,220 Filing Receipt and Specification, "A method and apparatus for creating and managing groups for increasing buying power on the World Wide Web," Feb. 8, 1999.

Article from Sportfack, "Letsbuyit.com Kommer," Feb. 12, 1999 (with English Translation).

Kroll et al., "World Weary Web," Forbes, Dec. 28, 1998, pp. 98–100.

Pant et al., "Business on the Web: Strategies and Economics," Fifth nternational WWW Conference, May 6–10, 1996, Paris, France.

Rockoff et al., "Design of an Internet–based System for Remote Dutch Auctions," *Internet Research: Electronic Networking Applications and Policy,* 5(4):10–16, 1995.

Stang et al., "Scans" Section, *Wired,* Sep. 1995, 51, 54, 56 and 58.

Woolley, "Price War!," *Forbes,* Dec. 14, 1998, pp. 182 and 184.

"Retail Ferderation Group Buying Set," HDF—The weekly Home Furnishing Newspaper, v0, n0, pp. 9, 26 Dec. 1994.

"Frontier Rings Up A Sale With National Retail Federation," PR Newswire, p118NYM057, Jan. 19, 1998.

"NRF: home page on World Wide Web (National Foundation Launches Site)," The Weekly Newspaper for the Home Furnishing Network, v70, n42, p. 10(1), Oct. 14, 1996.

"Retail Federation Group Buying Set," HFD—The Weekly Home Furnishings Newspaper, v68, n52, p. 9(1), Dec. 26, 1994.

"Mosher views ARA as survival kit for small specialty stores," Daily News Record, v24, n22, p. 4(1), Feb. 2, 1994.

"KMART Targets GE as EDI Provider Signals GE's Re–Commitment to EDI," EDI News, v11, n21, Oct. 13, 1997.

"National Federation Selects GE Information Services for EDI Service Partnership," PR Newswire, p1006DCM009, Oct. 6, 1997.

Mielczarski, W.; Michalik, G.; Widjaja, M.; "Bidding strategies in electricity markets,"PIC Proceedings of the 21st 1999 IEEE International Conference, pp. 71–76, May 16–21, 1999, Cat.#99CH36351, 1999.

Press Release from MobShop, formely known as Accompany, Inc., obtained from the Internet at http://www.mobshop.com/press_release?release=20 on Apr. 10, 2000, which explains that Accompany, Inc. recieved a Notice of Allowance from the U.S. Patent & Trademark Office.

Press Release from iCoop, Inc. obtained from the Internet at http://www.icoop.com/press_pressrelease2.htm on Apr. 10, 2000, which explains that iCoop, Inc. has filed two patent applications and has provisional patent applications which were filed on Jan. 22, 1999.

Press Release from beMANY! obtained from the Internet at http://www.bemany.com/press02112000_bemany.html on Apr.10, 2000, which explains that beMANY! has a "patent pending process.".

Press Release from the company BazarE.com obtained from the Internet at http://www.bazaare.com/pr_03111999.cfm?CFID+62916&CFTOKEN+75630214 on Apr. 10, 200, which explains that BazaarE.com has a "patent–pending platform".

*An Exploratory Study of the Emerging Role of Electronic Intermediaries,* Joseph P. Bailey and Yannis Bakos, International Journal of Electronic Commerce, vol. 1, No. 3, Spring 1997, pp. 7–20. (Document submitted includes Abstract and pages numbered 1–14).

DYNAMIC MARKET EQUILIBRIUM MANAGEMENT SYSTEM, PROCESS AND ARTICLE OF MANUFACTURE

BACKGROUND OF THE INVENTION

1. Field of the Invention

The present invention relates to a dynamic market equilibrium management system for the sale of goods and services, also sometimes referred to herein as a "management system" or "market equilibrium manager." More particularly, it relates to such a dynamic market equilibrium management system for use in e-commerce applications, such as on-line. The invention further relates to a user interface allowing more convenient and skillful data management for hypothetical situations and related applications.

2. Introduction to the Invention

The above on-line buying groups invention provides a method and apparatus to globally locate, encourage and enable all buyers wishing to purchase a particular product or service within a given time frame to join forces in a buying group ("co-op") formed specifically to accomplish the desired purchase. The co-op will enable individual buyers to leverage their combined purchasing power to achieve an economic bargain far superior to that attainable by any one buyer acting alone. This superior bargain most often will be reflected in terms of a lower price.

That invention also provides a method and apparatus that allows each buyer an opportunity to increase the volume of any given co-op in order to further increase group buying power within a co-op. It also includes a mechanism through which buyers can form any number of special interest groups, provide their collective wisdom to dictate which products are featured in future co-ops, or even make a market for a given product or service.

Other key aspects of that invention include a means to allow unprecedented access to certain true market data and pricing information derived from co-op member input during the life of each co-op. For example, all buyers wishing to join a co-op must submit a binding offer guaranteeing their willingness to purchase the featured item at or below some maximum price determined by each individual member. This collection of purchase offers provides valuable quantitative data regarding price sensitivity for the featured item. In addition, it permits real time yield management decisions that often will benefit both buyers and suppliers. Specifically, the invention provides data from which a supplier can be informed that if the product price is reduced by a specified amount, the co-op's pool of accepted offers—i.e., final sales—will increase by a specific quantity. The guaranteed increase in volume due to a reduced price would improve its overall yield. Under this scenario, both the co-op buyers and the product supplier benefit from the indicated price reduction.

The present invention provides a dynamic market equilibrium management system which permits one to quickly and conveniently define and achieve market equilibrium (i.e., the ideal point at which supply meets demand for a given product or service). When adapted for use with the related invention described above, it utilizes the true market data and pricing information made available through such related invention to allow more effective and skillful market management, such that market equilibrium can be quickly defined and achieved for any given co-op. While the present invention is especially adapted for use with the system, process and article of manufacture described and claimed in the related application, its features and advantages make it useful as well in a wide variety of other e-commerce applications and even for managing other markets which are not implemented in an on-line environment.

Other ways in which this invention provides unique benefits to market managers for the sale of goods and services in electronic commerce are set forth in various parts of this document below.

3. Background (Prior art)

Historically there has been no way for a supplier to predict with certainty the price at which a product must be sold in order to increase sales volume by a specified amount. Under traditional sales models, pricing decisions are made based on estimates, such as anticipated product demand and presumed price sensitivity, in the hope that supply will approximate demand at the selected price. If a supplier of a particular item could rely on guaranteed purchase offers to increase volume at varying levels of acceptable sales prices and utilize a tool to quickly and skillfully define market equilibrium, such a tool would be extremely valuable to the supplier. Among other things, it would permit instantaneous, accurate yield management decisions that often would encourage win-win price reductions. The supplier wins by improving his overall yield based on volume, and the buyer wins by getting a lower per unit price.

Further, existing sales models and tools do not offer suppliers a clearly superior means of quickly reducing large quantities of specific product inventory (such as a close out item) in a way that will permit both maximization of yield and fast movement of an extremely large quantity of product. Similarly, there exists no clearly superior sales channel through which a supplier can readily turn to swiftly create an extremely large, global market for a specific product to significantly increase market share for that product, in a format that permits skillful yield management.

It is also known in existing spreadsheet programs to recalculate derived values automatically from data changes entered into the spreadsheet. Display of such recalculated values facilitates evaluation of hypothetical "what if" scenarios for making business decisions. However, this is done by changing a value in a cell of the spreadsheet, resulting in recalculating all variable entries dependent on the variable changed. It is not easy for the user to see the global effect of such changes without a careful review of the recalculated spreadsheet or separate screens showing graphs derived from the recalculated spreadsheet. The result is a cumbersome iterative process in which the user must change a value in a cell of the spreadsheet, obtain a graph of the resulting dependent variable changes, determine whether those results are as desired, if not, go back to the spreadsheet and make another value change in a cell, redraw the graph, and so forth until desired results are achieved. The process is even more cumbersome if the user desires to add a line to a graph, which requires the generation of new cells in the spreadsheet.

Specific examples of e-commerce systems implemented on the Internet or other networks are disclosed in the following issued patents: U.S. Pat. No. 4,789,928, issued Dec. 6, 1988 to Fujisaki; U.S. Pat. No. 5,794,207, issued Aug. 11, 1998 to Walker et al.; U.S. Pat. No. 5,797,127, issued Aug. 18, 1998 to Walker et al.; U.S. Pat. No. 5,835,896, issued Nov. 10, 1998 to Fisher et al. and U.S. Pat. No. 5,845,265, issued Dec. 1, 1998 to Woolston.

Various examples of yield management systems and processes are disclosed in the following issued patents: U.S. Pat. No. 5,729,700, issued Mar. 17, 1998 to Melnikoff; U.S. Pat. No. 5,270,921, issued Dec. 14, 1993 to Hornick; U.S.

Pat. No. 5,255,184, issued Oct. 19, 1993 to Hornick et al. and U.S. Pat. No. 5,148,365, issued Sep. 15, 1992 to Denbo.

4. Benefits of the Invention

In order to join a co-op, each buyer must determine the maximum price at which (or below) he or she is willing to purchase the featured item. Such amount is specified in his or her binding purchase offer. That offer is guaranteed by the buyer's credit card. All offers including the various amounts at which they are submitted are collected and summarized in a database. This process enables accurate, real-time yield management decisions which can be used to advocate a lower per unit price. For example, the business entity implementing the invention would be able to determine ideal market equilibrium based on true market data, and represent to a supplier that if the price were lowered by $X, the sales volume will increase by an additional 1,000 units. Although the per unit price would drop, the supplier's overall profit yield may increase due to the substantial increase in volume. Hence, this invention permits the business implementing the invention to quickly and meaningfully assess the forces of supply and demand and communicate conclusions based on true market data to suppliers in order to eliminate the uncertainty that would otherwise make suppliers reluctant to lower prices.

Further, this invention provides instantaneous yield management capabilities which enhance virtually all aspects of the related buying groups invention. For example, the related invention's method of globally creating buying groups on a purchase by purchase basis provides a unique method of quickly moving large quantities of specific products. For instance, a supplier might utilize that invention's sales platform to sell a substantial volume of one product for the specific purpose of increasing its market share. A supplier also could utilize the related invention as a platform for unloading a large volume of specific products nearing the end of their product life cycle. Suppliers also might utilize the related invention as a means to accomplish swift inventory leveling for cash flow or financial reporting purposes. All such applications of the related invention are significantly enhanced by this invention because it enables suppliers to accomplish these objectives in a format that quickly and conveniently defines market equilibrium, which, in turn, permits them to maximize yield in each such transaction.

In contrast to the cumbersome procedure described above for use of a spreadsheet program to study results of "what if" scenarios, the direct manipulation of graphical visualizations of data with the user interface of this invention produces the changes in the underlying tabular data directly, so that the user sees the results of changes directly on the visualized data, without having to move successively between tabular spreadsheet data and a graph of that data. This direct versus indirect approach allows the much more convenient and skillful data manipulation for hypotheticals and similar situations.

Definitions

Certain terms as used herein are defined as follows:

Browser: A specific type of client system, referring to an HTTP client enabling the display of various forms of information originating at the server; also capable of sending information, such as requests and personal data, to the server at the request of the end user. A browser is not the only possible or intended client system. Our method and apparatus apply only to the server, and are not dependent on what form of client is used, only that some client exists as the means of input.

Co-op: For the purposes of this application, the term 'co-op' as used throughout is not intended to refer to the traditional cooperative form of business which is owned by all of its members. A business organization implementing this invention need not be organized as a cooperative. Instead, we use the term 'co-op' to refer to the online manifestation of buying groups who have committed to purchase a certain product within a specified price (i.e., at or below a maximum price). Co-ops are also occasionally referred to herein as 'buying groups,' 'buying co-ops' and 'product co-ops.'

Critical Mass: The volume of acceptable offers necessary before any purchase offers will be accepted. The critical mass may be specified by a supplier. It may also be the sales volume at which the starting co-op price is justified.

Current Price: The price stated as current at any given time during the co-op. One significance of the current price is that availability is guaranteed for offers at or above such price after critical mass is achieved.

E-commerce server: Is here used to refer to a specific server software system, residing on a set of CPUs, that is used to send information to the client system(s) and accepting input from said clients for the sole purpose of taking orders, whether they are for co-ops or not.

Ending Price: The price specified at the end of the co-op, which represents the price at which all offers are accepted.

Featured Product: Any product or product variant identified for sale through a co-op. For purposes of this application, the term 'featured product' includes any services which might be identified for sale through a co-op.

HTTP: The Hyper-Text Transfer Protocol.

HTTP server: A specific server software system, residing on a set of CPUs, which is used to communicate with client systems such as HTTP browsers. The HTTP server is only one means of communication between the client and server, and its inclusion in this discussion of our invention is not meant to imply that it is the only means of implementation of the invention.

Market Equilibrium: The ideal point at which supply for a given product or service meets demand for such product or service.

Offer or Purchase Offer: A binding, non-cancelable offer to purchase a featured product within a price range the maximum of which is specified by the buyer. Each such offer is guaranteed by the respective buyer's credit card at the time it is offered. Making an offer is a condition precedent to joining a co-op. The offer is either accepted or rejected at the close of the co-op.

Price Curve: A description of price as a function, in the mathematical sense, of the number of units. See FIGS. 3A–3E.

Product and Product Variant: A product is a set of items for sale, which all has a certain set of significant characteristics in common. For example, a particular brand and style of in-line skates, each having the same characteristics, such as design, brand, color, a left and a right skate sold together, etc. A product variant is a subset of a product. For example, size 5 and size 8 of a particular pair of in-line skates are different variants of the same product. As used herein, a product can be a tangible or intangible object or a service.

Server: The term 'server' is here used to refer to the set of hardware and software systems that are used to implement co-ops in accordance with this invention. These systems are to be distinguished from the client systems that are used by buyers to participate in co-ops. See FIGS. 2 and 4.

Server process: A computer program that is part of the server software systems, and which executes in its own address space, communicating with other processes via means defined by the operating system(s) of the hardware platforms. Unfortunately, it is necessary to use the term 'process' to describe other things than computer programs executing in their own address space in this application, so care has been taken to always use the term 'server process' when the latter is meant.

Starting Price: The price listed as the current price at the beginning of each co-op.

SUMMARY OF THE INVENTION

In accordance with a first aspect of the invention, a system for defining a price curve and approaching market equilibrium in an on-line buying co-op for a product includes an e-commerce server data processing system. The e-commerce server data processing system has e-commerce server software executable on the e-commerce server data processing system and configured to define an on-line buying co-op for a product. A storage device is coupled to the e-commerce data processing system and has stored therein a database including at least price and quantity data for the product. A merchandising staff client data processing system is coupled to said storage device. The merchandising staff client data processing system includes client software executable on the merchandising staff client data processing system and configured to receive merchandising staff inputs for defining the on-line buying co-op for the product. The client software includes a market equilibrium manager to establish a price curve for the product in the on-line buying co-op by utilizing the price and quantity data for the product in the database.

In a second aspect of the invention, a process for defining a price curve and approaching market equilibrium in an on-line buying co-op for a product includes defining an on-line buying co-op for a product. A database including at least price and quantity data for the product is stored in a storage device. Inputs from buyers to take offers for the product are accepted. The buyer inputs are used to modify the database. Merchandising staff inputs utilizing a market equilibrium manager are received to establish a price curve for the product in the on-line buying co-op by utilizing the price and quantity data for the product in the database.

In a third aspect of the invention an article of manufacture comprises a computer readable medium having stored therein a computer program for defining a price curve and approaching market equilibrium in an on-line buying co-op for a product. The computer program has a first code segment for defining a buying co-op for a product. A second code segment stores in a storage device a database including at least price and quantity data for the product. A third code segment accepts inputs from buyers to take offers for the product. A fourth code segment uses the buyer inputs to modify the database. A fifth code segment receives merchandising staff inputs utilizing a market equilibrium manager to establish a price curve for the product in the on-line buying co-op by utilizing the price and quantity data for the product in the database.

In a fourth aspect of the invention, a system for providing a graphical user interface for displaying data graphically includes a display, a data processing system coupled to the display and a storage device coupled to the data processing system and containing a database. First software in the data processing system is configured to control the data processing system for providing a graphical display of data from the database. Second software in the data processing system is configured to receive user inputs for directly manipulating the graphical display of the data. Third software in the data processing system is configured to supply modified data based on the manipulation of the graphical display of the data to said database. Fourth software is coupled to the database for recalculating dependent variables of the modified data. Fifth software in the data processing system is configured to display feedback dependent variable data on said display with the graphical display of data from the database.

In a fifth aspect of the invention, a process for providing a graphical user interface displaying data graphically with a data processing system includes storing data in a database. A graphical display of data from the database is provided on a display device of the data processing system. User inputs to the data processing system are received for directly manipulating the graphical display of the data. Modified data based on the manipulation of the graphical display of the data is supplied to the database. Dependent variables of the modified data are recalculated. Feedback dependent variable data is displayed on the display device with the graphical display of data from the database.

In a sixth aspect of the invention, an article of manufacture includes a computer readable medium having stored therein a computer program for providing a graphical user interface displaying data graphically with a data processing system. The computer program has a first code segment for storing data in a database. A second code segment provides a graphical display of data from the database on a display device of the data processing system. A third code segment receives user inputs to the data processing system for directly manipulating the graphical display of the data. A fourth code segment supplies modified data based on the manipulation of the graphical display of the data to the database. A fifth code segment receives recalculated dependent variables of the modified data. A sixth code segment displays feedback dependent variable data on the display device with the graphical display of data from the database.

Introductory Description of the Method

Merchandising and yield management personnel will define each co-op by means of data entry. Such data entry is not limited to time prior to the opening of a co-op. The definition of a co-op, including its price curve, is subject to modification during its lifetime. In fact, the ability to modify the co-op definition based on data gathered from offers to participate in a co-op is an essential aspect of the invention.

The attainment of the foregoing and related advantages and features of the invention should be more readily apparent to those skilled in the art, after review of the following more detailed description of the invention, taken together with the drawings, in which:

DESCRIPTION OF SPECIFIC EMBODIMENTS

The drawings show preferred forms of a dynamic market equilibrium management system, process and article of manufacture suitable for implementing the invention.

Introductory Description of the Apparatus

Figure 2:
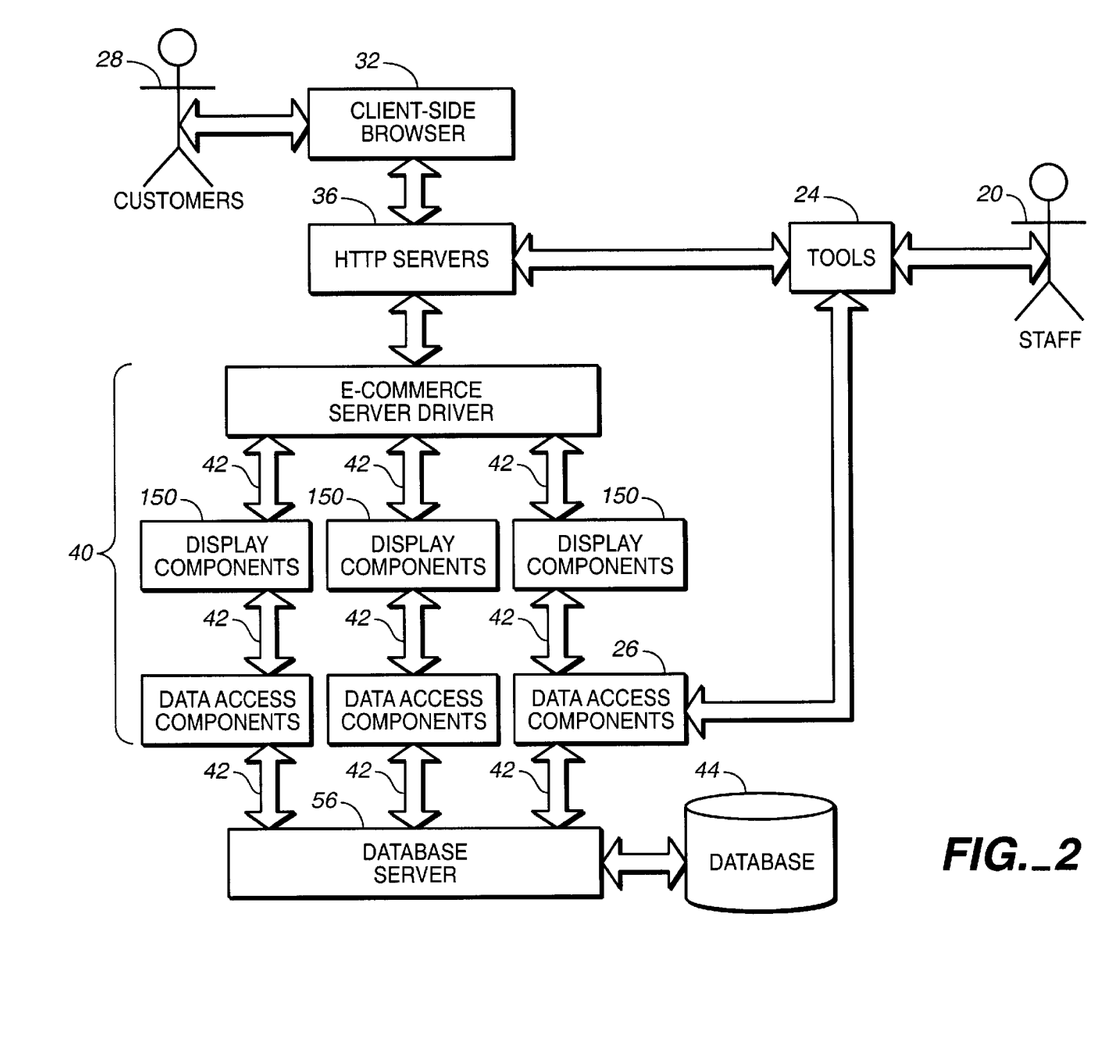
FIG. 2 is a block diagram of software components for implementing the invention.
Figure 4:
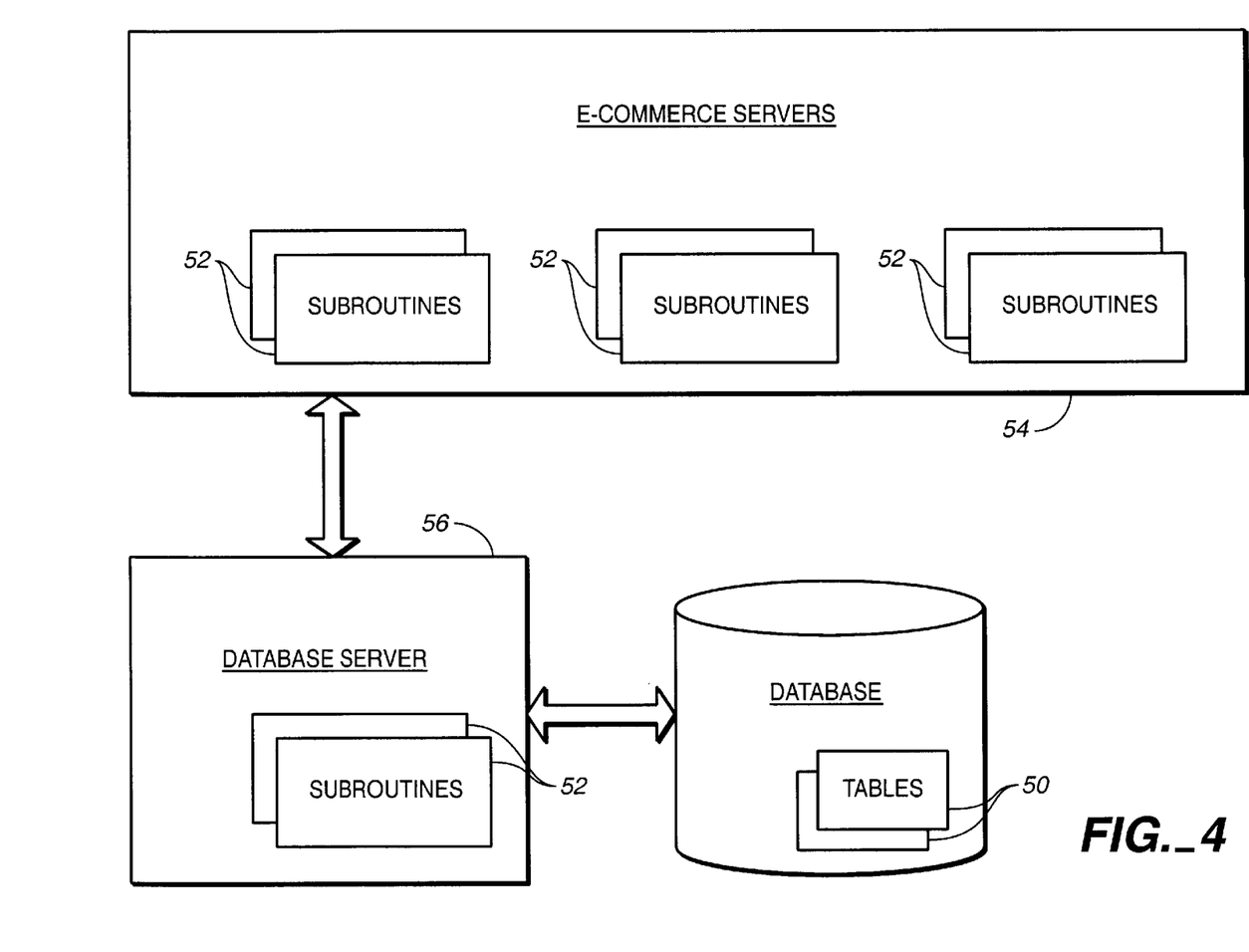
FIG. 4 is a first more detailed block diagram of a portion of the software components in FIG. 2 for implementing the invention.

As shown in FIGS. 2 and 4, merchandising and yield management staff 20 defines a co-op in accordance with the invention using client computer 22 and client software 24, comprised of a set of tools, including but not limited to the market equilibrium manager. The tools 24 communicate with the server processes 26, including but not limited to the database process, to enter the data relevant to each co-op.

The buyer 28 accesses all aspects of the co-op using a client computer 30 running a browser 32 or some other type of client computer program. The client computer program 32 communicates via some means of physical communication layer 34, e.g. the Internet, with a server 36, i.e. the HTTP server, or a server with similar purpose. The HTTP server 36 further communicates, using public or proprietary protocols, with an e-commerce server 38, which contains the principal software for implementing this invention.

The e-commerce server 38 software and related components is comprised of a set of server processes 40, a means 42 of communication between the server processes 40, and a database 44 to hold data significant to the process of taking offers and otherwise interacting with the buyer 28. The capabilities of the e-commerce server software and related components extend far beyond the ability to handle co-ops and implement the market equilibrium manager. The present invention is directed to the capabilities that pertain to co-op market management. The other capabilities of the e-commerce server 38 software and related components are implemented with software modules and routines known in the art and will not be described beyond that necessary to understand the invention.

As shown in FIG. 4, co-ops are primarily manifested by a set of database tables 50 that define the essential properties of the co-ops, a set of program subroutines 52 and server processes 54 and 56 defining the logical processing necessary to manage co-ops and their interaction with buyers, and data contained in the database tables 50 defining the values of the essential properties that define each co-op. In particular, the tables 50 contain data that defines the price curves as depicted in FIGS. 3A–3E.

Figure 3A:
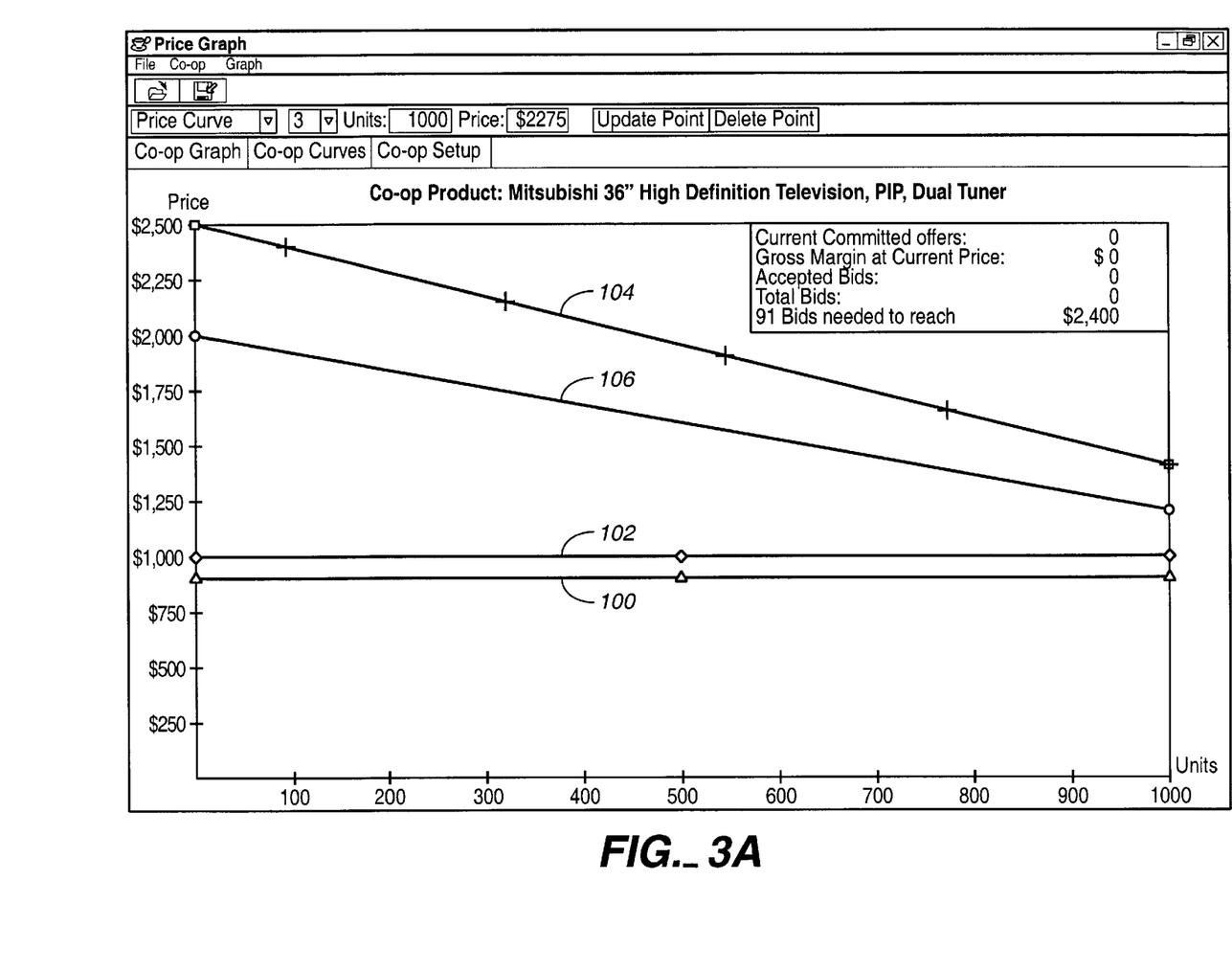
FIGS. 3A–3E is a set of sequential graphs of price curves useful for understanding operation of the invention.

An example of a price curve set as initially established during the process of setting up a buying co-op is shown in FIG. 3A, in this case for a Mitsubishi 36" high definition television set. In this simple model, a constant cost of $875 as shown at 100 and a constant minimum price of $1,000 for which offers will be recorded as shown at 102 are depicted. A price curve 104 shows a declining price for the product with an increasing number of acceptable offers for the product, up to a maximum of 1,000 units, which is the usual case. In principle, an increasing price for the product could be provided in the case of a product with a limited supply, such as a limited edition collectible. Curve 106 represents a minimum offer threshold which will be used by the market equilibrium manager to modify the price curve 104 as offers are submitted by potential buyers. As long as an offer is above any minimum price 102, it will be recorded, but if it is below the minimum offer threshold 106 at that point in the co-op, it will not be used to modify the price curve 104 or the minimum offer threshold curve 106.

Figure 3B:
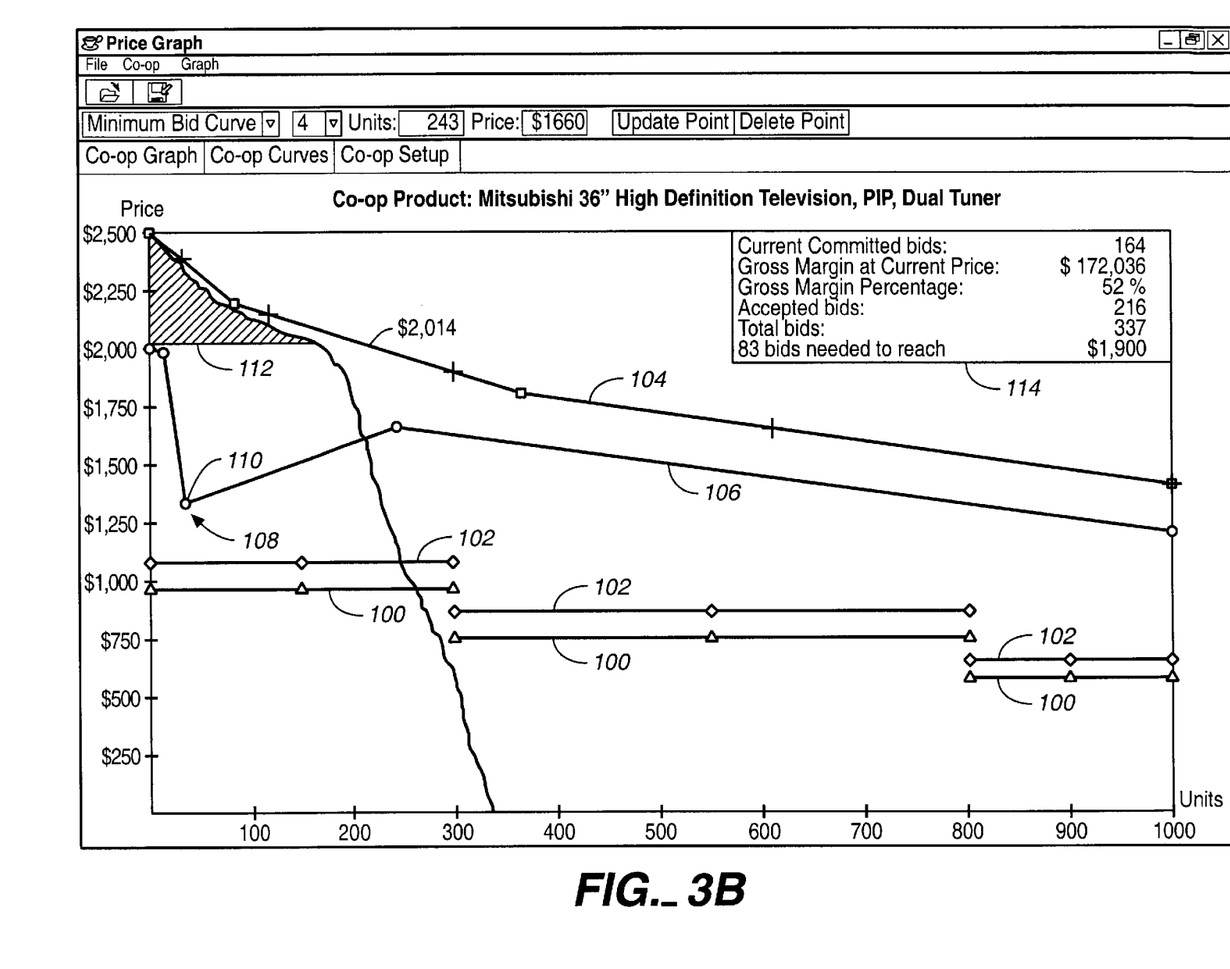

As data is gathered from buyers, by means of their making offers, the co-op is modified using the market equilibrium manager, so as to take into account the market data in the definition of the price curve set. FIG. 3B shows such a modified curve set early in the history of the co-op. An additional change shown in FIG. 3B from the price curve set shown in FIG. 3A is that cost curve 100 and minimum price curve 102, corresponding respectively to the curves 100 and 102 in FIG. 3A, are in three segments to reflect typical volume discounts. The market equilibrium manager code is configured to allow such modifications to be made directly on the displayed curves through use of a mouse or other pointing device. The minimum offer threshold curve 106 has also been modified in FIG. 3B to give an inflection at 108 by dragging data point 110 with a mouse. As a result, some previous offers that were below the threshold curve 106 and above the minimum price curve 102 and thus ignored for the purpose of modifying the price curve 104 for the co-op, are now used to modify the price curve 104. This has the effect of modifying the price curve 104 as shown. Also shown in FIG. 3B is a histogram 112 of the total of 164 committed offers (see the data in block 114) that have been deemed acceptable at this point in the co-op because the maximum price at which they were made was equal to or greater than the current price of $2014 on price curve 104 for that volume of sales. The data at 114 also shows that a total of 216 acceptable offers have been used to modify the price curve 104 and that the co-op will produce a gross margin of $172,036. As merchandising staff modify the curve set shown in FIGS. 3A–3E to test "what if" scenarios, immediate direct numeric feedback on the effect of those modifications is given in the data of block 114.

Figure 3C:
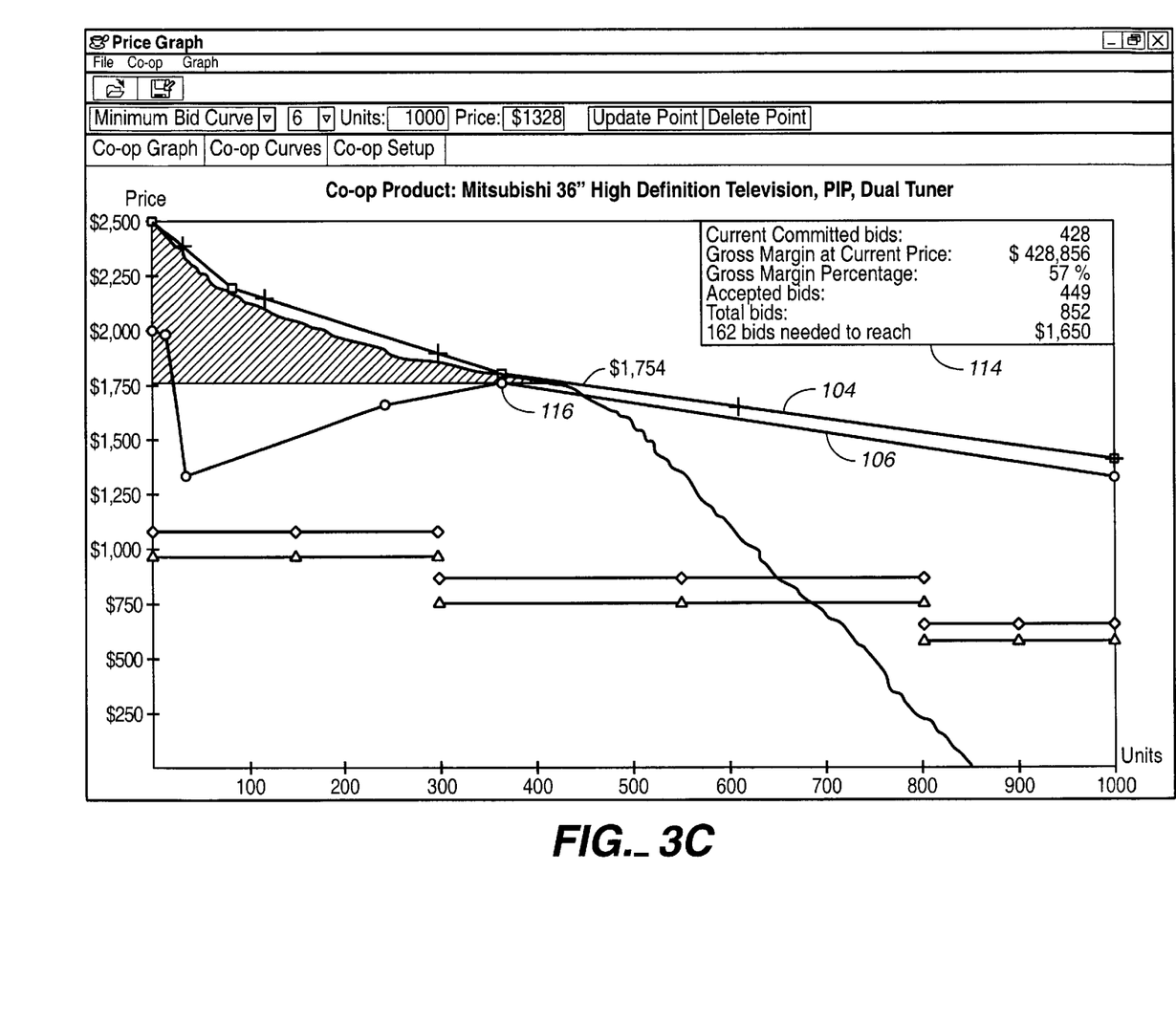

FIG. 3C shows the curve set in FIG. 3B at a later time in the operation of the co-op. Minimum threshold offer curve 106 has again been modified by direct input, i.e., dragging data point 116 to a point just below the price curve 104. This modification means that only offers that are quite close to the current price of $1,754 on the price curve 104 will be used for further modification of the price curve, having the effect of minimizing further price adjustments and potentially lengthening the duration of the co-op to avoid a premature close. Block 114 now shows a total of 428 committed offers at the current price at this point in the operation of the co-op, with a gross margin of $428,856.

Figure 3D:
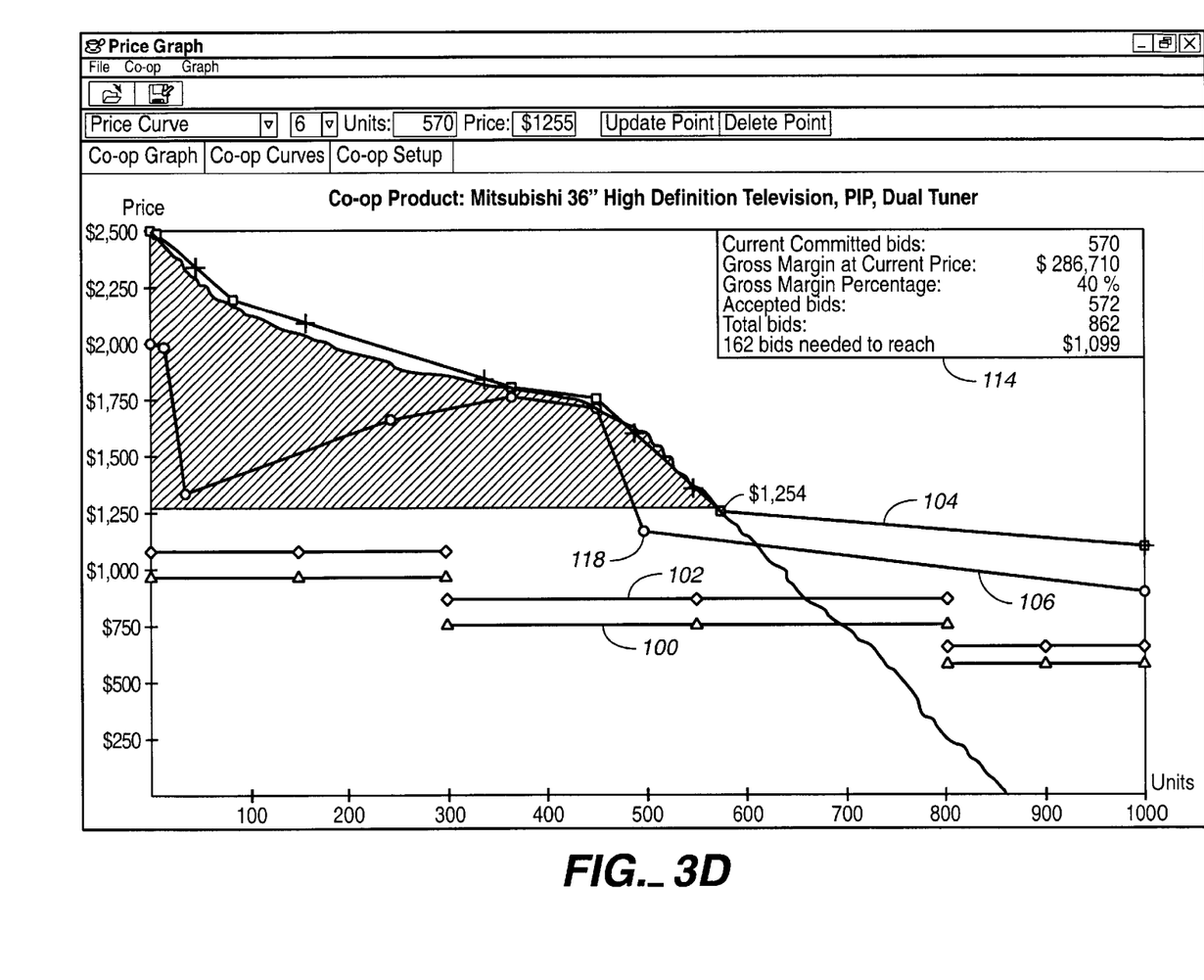

FIG. 3D shows the curve set in FIGS. 3B and 3C at a still later time in the operation of the co-op. Minimum threshold offer curve 106 has once again been modified by direct input, i.e., dragging data point 118 down toward the cost curve 100 and minimum price curve 102. Note that this modification produces a substantial change in the price curve 104 and that the current price for the television set has now dropped to $1,254. Block 114 now shows a total of 570 committed offers with a gross margin of $288,710. Thus, the gross margin at this point has been substantially reduced. Such a modification would not be made in the curve 106 unless it was clear that a substantial reduction in price was needed to sell remaining inventory in the co-op.

Figure 3E:
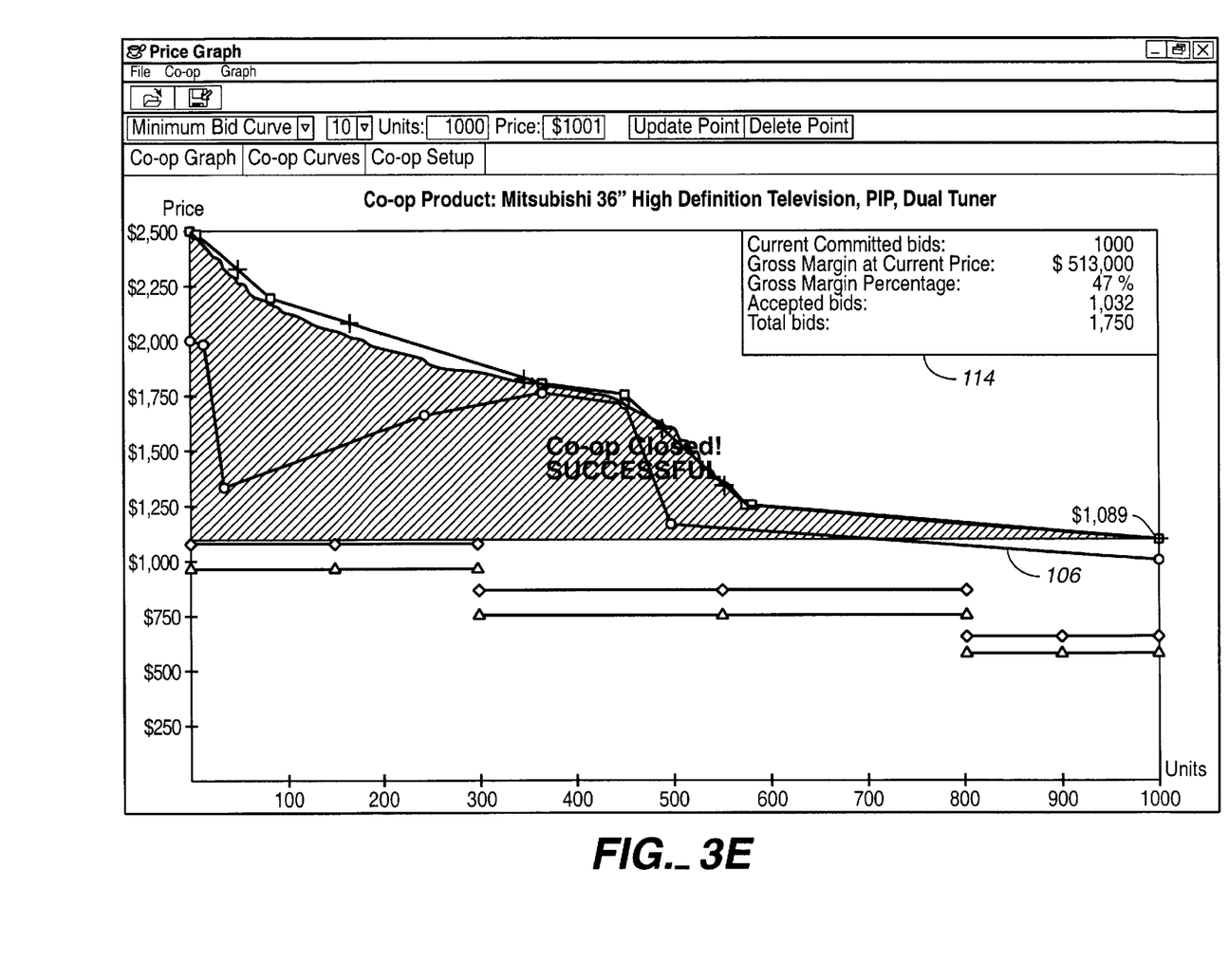

However, comparing FIGS. 3D and 3E shows that, with no further modifications to the minimum threshold offer curve 106, all 1,000 of the television sets are sold at a price of $1,089, giving a gross margin of $513,000. The ability to follow the progress of a co-op with data feedback from modifications to the displayed curve set itself shown in the block 114 provides a powerful management system for buying co-ops.

Co-op Selection

In order to select a co-op for participation, the buyer is presented with the following essential co-op information: current price and closing time. The buyer may also be shown the next price level (as defined by the price curve visibility window and the price curve), sufficient for the buyer to determine the urgency of an offer.

Offers below Current Price

Once a buyer has made up his mind to join a co-op, the decision must be made to make an offer at a price which encompasses the current price, guaranteeing availability once critical mass is achieved, or to make an offer contingent on a lower maximum price, which may not result in a successful purchase regardless of whether critical mass is achieved.

Given the decision to make an offer, the steps are as follows:

1. The buyer enters an offer which specifies the maximum price at which he is willing to purchase the product, his credit card number and any other pertinent information.
2. The system acknowledges his offer.
3. The system authorizes his credit card for the maximum price specified in his offer, such that his offer is guaranteed to be valid.
4. If the offer is at or above the minimum threshold curve, the current price may be affected as defined by the price curve, and any new price may be displayed.
5. If the offer is below the minimum threshold curve, the offer is still recorded, but it is disregarded from the pool of offers allowed to impact current price. The reasonable range of offer prices defining the minimum threshold curve may be derived from the price curve itself, and/or external merchandising factors.
6. Should the current price drop to or below the price level at which the offer was made, such offer is included within the pool of offers to be accepted at close of the co-op and will be processed as such at close. Inventory is allocated to fulfill the order immediately after the co-op closes.

Offers at Current Price

Given the decision to make an offer specifying a maximum price at the co-op current price, the steps are as follows:

1. The buyer makes a non-cancelable offer to purchase the featured product at a range which includes the current price as the maximum acceptable price.
2. The system acknowledges the offer, and at close of the co-op, if the critical mass has been met, the system indicates to the buyer that his offer is accepted.
3. Inventory is allocated to fulfill the order.

Co-op Close

A co-op will result in final sales only if the required critical mass is met. Assuming critical mass is achieved, the steps taken upon closing of a co-op are as follows:

1. The final co-op price is fixed and applied to all offers specifying maximum prices at or above the final co-op price.
2. All offers meeting the criteria above are accepted and converted to final sales by the e-commerce server, which are then communicated to product supplier and/or a fulfillment representative, which ships the products and charges the buyer's account.
3. All buyers that made successful offers are notified of the success thereof, and notified of the final price.
4. The buyers that made unsuccessful offers are likewise notified of the situation.

Detailed Description of the Apparatus

Figure 1:
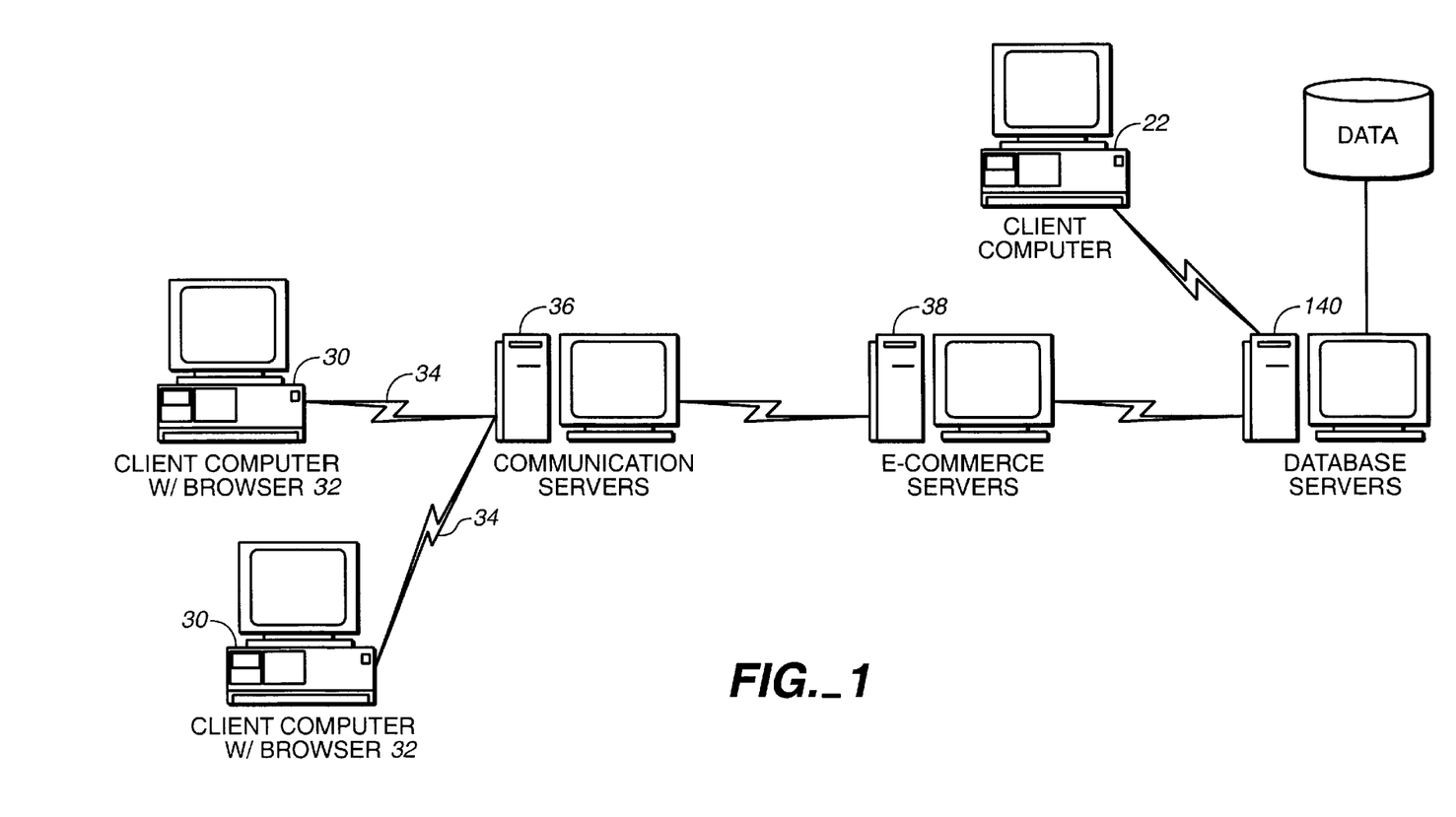
FIG. 1 is a block diagram of an internetworked computer system for implementing the invention.

The apparatus and software for practicing the preferred implementation of the invention is shown in FIGS. 1, 2 and 4.

Servers

The server systems are comprised of the following hardware and software components:

* A set of computers 36, 38 and 140, having the standard definition of a computer system.
* A set of server programs, configured to execute on said set of computers. The server programs consist of:
  1. A set of database servers 56 holding the database tables and their data.
  2. A set of e-commerce servers 54 that hold the executable commerce-related logic, interacting with the client via:
  3. A set of HTTP servers 36, or other such servers with similar purpose, namely being dedicated to being the communication link between the client 32 and the e-commerce servers 54.

Database Tables

The apparatus is further comprised of a set of database tables 50, including, but not limited to:

* MC_COOP—defining the co-op in detail, including, but not limited to, these fields:
  - PRODUCT_ID The unique ID for the product being offered
  - MC_COOP_START_DATETIME The date/time that the co-op is scheduled to open
  - MC_COOP_FINISH_DATETIME The date/time that the co-op is scheduled to close (might close early if sell all products)
  - MC_COOP_MINIMUM_QUANTITY The minimum quantity that we must sell
  - MC_COOP_MAXIMUM_QUANTITY The maximum quantity that we can sell
  - MC_COOP_ORDER_QUANTITY_LIMIT The limit on the # of items that can be ordered by a single customer
  - MC_COOP_BID_REJECT_THRESHOLD Price limit: below this price an offer is not considered "reasonable"
  - MC_COOP_PRICING_SCHEME Defines whether price curve is line segments or step-wise
  - MC_COOP_COST_SCHEME Defines whether cost curve is line segment or step-wise
  - MC_COOP_IGNORE_SCHEME Defines whether ignore curve is line segments or step-wise
  - MC_COOP_STATUS Overall status (not yet started, etc.)
  - MC_COOP_WINDOW_PRICE Height of price window (used to encourage customers to notify their friends)
  - MC_COOP_CURRENT_PRICE The current price for the co-op item (by definition, some point on the price curve)

* MC_OFFER—defining the offers that have been made for a co-op, including, but not limited to, these fields:
  - OID A unique identifier for the offer
  - MC_COOP_OID The unique identifier for the co-op
  - MC_OFFER_USER_ID The unique identifier for the user who submitted the offer
  - MC_OFFER_DATETIME The date/time the offer was submitted (early offers get priority)
  - MC_OFFER_PRICE The price that was offered
  - MC_OFFER_QUANTITY The quantity that was requested
  - MC_OFFER_SHOWN_PRICE The current c-op price at the time the offer was made (to calculate savings)
  - MC_OFFER_MERCATA_BUCKS_EARNED Part of the loyalty management program
  - MC_OFFER_SHIPPING_ALIAS Identifies shipping destination (needed if offer becomes a real order)

■ MC_OFFER_PAYMENT_ALIAS Identifies payment method (needed if offer becomes a real order)

A set of price curve tables, all with the same fields.

* MC_COOP_PRICE_CURVE Defines the co-90 price curve (or steps)
* MC_COOP_IGNORE_CURVE Defines the co-op ignore curve (a "throttle" on the speed of the co-op)
* MC_COOP_COST_CURVE Defining the points of the price curve for the co-op, including, but not limited to, these fields:

1. Coop_ID: The co-op identifier that this price curve point is relevant for.
  2. Threshold_Quantity: The quantity coordinate for the price curve point.
  3. Threshold_Price: The price coordinate for the price curve point.

MC_COOP_WISHLIST—defining the individual suggestions for new co-ops that have been made by various buyers.

Program Logic

The program logic of this invention consists of several components, shown in FIG. 2, all residing within the e-commerce servers 54. They include, but are not limited to:

1. Co-op display components 150, having the purpose of presenting information to the users via the HTTP servers and client browser software, and further interpreting the inputs of the users (merchandising staff as well as buyers) and translating those inputs into new presentation of information and/or manipulations of the data stored in the system. The display components that are primarily relevant to this invention are:

MC Product List Display a list of products, showing co-op information

MC Product Details Display a single product, showing co-op information

Co-op offer & checkout Accept an offer from the user

E-mail a friend Encourage participants to add to the co-op by sending e-mail to the friends The product list and product details modules show the co-op product description, price (with an animated image in the background to show that the price may fall even further), product features, etc. The co-op offer & checkout accepts an offer from a customer regardless of whether the offer is at the current price or at some lower price. We take the customer's name, e-mail address, shipping destination, credit card information, and the amount of the offer. We also show some legal text which informs the customer that this offer is binding and will be converted to a real order if the co-op price meets their offer amount, etc.

2. Data access components 26, having the purpose of translating database information into data that can be used to display information to buyers. These components are also responsible for updating information in the database based on interactions with the users via the various clients 24 and 32, HTTP servers 36, and co-op display components 150.

The data access components 26 that are primarily relevant to this invention include, but are not limited to:

* MCI_Co-op, responsible for providing information regarding, and management of, individual co-ops. Management actions include changing the current price, adding offers at or below the current price, modifying the price curve and the price curve visibility window.
* MCI_Co-opManager, responsible for information regarding, and management of, sets of co-ops. This management includes finding co-ops with certain characteristics, creating new co-ops, and deleting co-ops that already exist.

Figure 5:
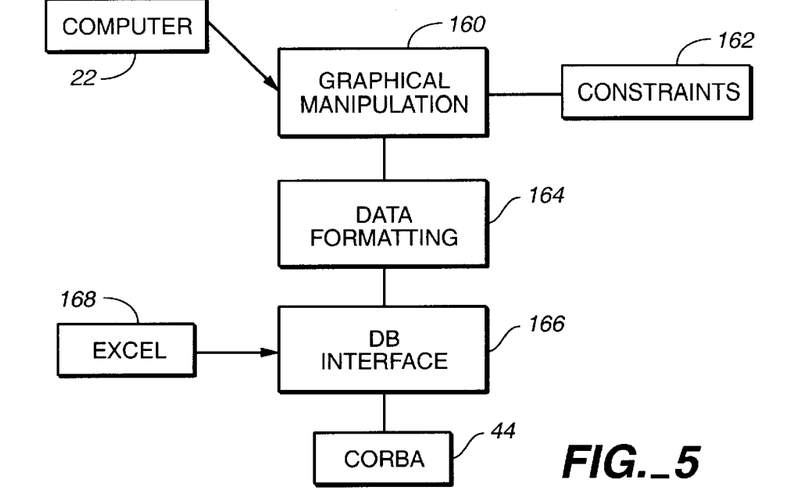
FIG. 5 is a second more detailed block diagram of a portion of the software components in FIG. 2 for implementing the invention.

Details of the software for displaying and skillfully managing the set of price curves shown in FIGS. 3A–3E are shown in FIG. 5. The software in the merchandising staff client computer 22 includes a graphical manipulation module 160, which is coupled to interact with a constraints module 162, which prevents certain graphical manipulations of the price curve set, such as offers above the current price or below the cost of the product in the co-op. The graphical manipulation module 160 is coupled to a data formatting module 164, which formats data represented by a modification to the set of price curves into a form suitable for storage in the database 44 (see also FIG. 2). As shown, the database is desirably, but not necessarily, stored in the common object request broker architecture (CORBA) form. The data formatting module 164 is coupled through a database interface module 166 to the database 44 to pass the formatted data to the database 44. In order to provide feedback on the effect of a direct data manipulation of the price curve set, suitable conventional software (not shown) recalculates variables dependent on the data modified by direct curve manipulation and feeds the results of those calculations to the graphical manipulation module for display on the curve set and in the data block 114 (FIGS. 3A–3E).

For comparative purposes, if a spreadsheet program 168 is used for data manipulation to test "what if" scenarios, changes in a data cell of the spreadsheet and resulting recalcuations of dependent cells are supplied by the spreadsheet program to the database interface module 166 for storage in the database 44. Any visual display of the data modifications and resulting recalculations would then be made using a graphing component of the spreadsheet. Observing the effects of making such changes using the spreadsheet program would be much less direct than observing the changes made by direct data manipulation with the graphical manipulation module 160.

Figure 6:
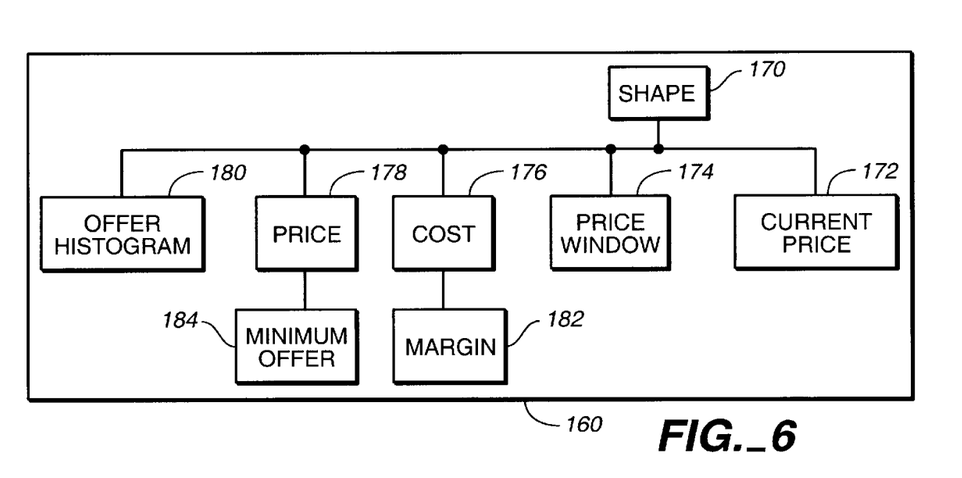
FIG. 6 is a third more detailed block diagram of a portion of the software components in FIG. 5 for implementing the invention.

Further details of the graphical manipulation module 160 are shown in FIG. 6. A shape function 170 is coupled to a current price function 172, a price window function 174, a cost function 176, a price function 178 and an offer histogram function 180. The cost function 176 is coupled to a margin function 182, and the price function 178 is coupled to a minimum offer function 184. These functions interact to produce the set of price curves shown in FIGS. 3A–3E.

Figure 7:
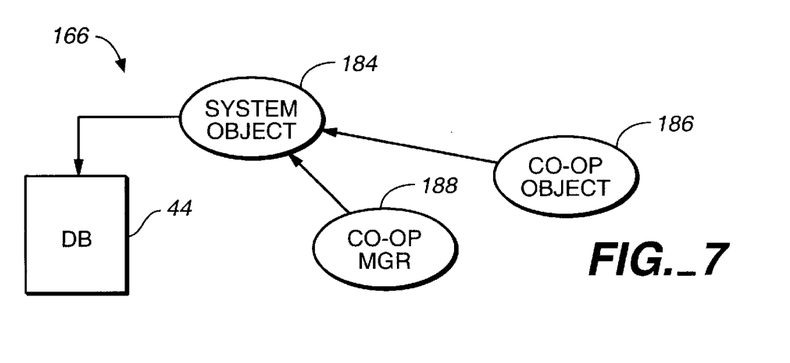
FIG. 7 is a fourth more detailed block diagram of a portion of the software components in FIG. 5 for implementing the invention.

Details of the database interface module 166 (FIG. 5) are shown in FIG. 7. The DB interface 166 includes a system object 184, which interacts with the database 44 in host server 140 (FIG. 1). A co-op object 186 manipulates co-ops and attributes of co-ops and interacts with the database 44 through the system object 184. A co-op manager object 188 finds and creates co-ops and also interacts with the database 44 through the system object 184.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A system for modifying a price curve and approaching market equilibrium in an on-line buying co-op for a product, which comprises:

(a) an e-commerce server data processing system, said e-commerce server data processing system including e-commerce server software executable on said e-commerce server data processing system and configured to define an on-line buying co-op for a product;

(b) a storage device coupled to said e-commerce server data processing system and having stored therein a database including at least price data for the product, quantity data for the product and offer data; and (c) a merchandising staff client data processing system coupled to said storage device, said merchandising staff client data processing system including client software executable on said merchandising staff client data processing system and configured to receive merchandising staff inputs for defining the on-line buying co-op for the product, said client software including a market equilibrium manager to modify a price curve for the product in the on-line buying co-op by utilizing the price data for the product, the quantity data for the product and the offer data in said database.

2. The system for modifying a price curve and approaching market equilibrium in an on-line buying co-op for a product of claim 1 in which said client software is further configured by including data entry tools to establish a start time and an end time for the on-line buying co-op, at least minimum quantities of the product offered and a starting price for the product.

3. The system for modifying a price curve and approaching market equilibrium in an on-line buying co-op for a product of claim 2 in which said client software is further configured by including a display component configured to manipulate and display data associated with the on-line buying co-op on said merchandising staff client data processing system.

4. The system for modifying a price curve and approaching market equilibrium in an on-line buying co-op for a product of claim 3 in which said e-commerce server software is further configured to store price and quanitty data of offer inputs from buyers as the offer data in said database and said market equilibrium manager is further configured to obtain updated price data and the offer data from said database, said display component being configured to display the price curve, and offer histogram, and other information suggesting the price point at which market equilibrium is achieved.

5. The system for modifying a price curve and spproaching market equilibrium in an on-line buying co-op for a product of claim 4 in which said display component is further configured to allow merchandising staff inputs to modify the price curve by direct manipulation of the price curve display.

6. The system for modifying a price curve and approaching market equilibrium in an on-line buying co-op for a product of claim 5 in which said client software is configured to translate the modified price curve to data with a data format for storage in said database.

7. The system for modifying a price curve and approaching market equilibrium in an on-line buying co-op for a product of claim 6 in which said display component is further configured to display a yield amount from sale of the product based on data from said database.

8. The system for modifying a price curve and approaching market equilibrium in an on-line buying co-op for a product of claim 7 in which said display component is further configured to modify the displayed yield amount from sale of the product as the price curve is modified.

9. A process for modifying a price curve and approaching market equilibrium in an on-line buying co-op for a product, which comprises:

(a) defining an on-line buying co-op for a product;

(b) storing in a storage device a database including at least price and quantity data for the product;

(c) accepting inputs from prospective buyers in the form of offers for the product;

(d) using the inputs from the prospective buyers to modify the database; and (e) receiving merchandising staff inputs utilizing a market equilibrium manager to modify a price curve for the product in the on-line buying co-op by utilizing the price and quantity data for the product in the database and the inputs from the prospective buyers.

10. The process for modifying a price curve and approaching market equilibrium in an on-line buying coop for a product of claim 9 in which the on-line buying co-op is defined by using data entry tools to establish a start time and an end time for the on-line buying co-op, at least minimum quantities of the product offered and a starting price for the product.

11. The process for modifying a price curve and approaching market equilibrium in an on-line buying co-op for a product of claim 10 further comprising the step of:

(f) managing, adjusting and displaying data associated with the on-line buying co-op.

12. The process for modifying a price curve and approaching market equilibrium in an on-line buying co-op for a product of claim 11 further comprising the step of:

(g) obtaining updated price data and offer data from the database and displaying the price curve and an offer histogram.

13. The process for modifying a price curve and approaching market equilibrium in an on-line buying co-op for a product of claim 12 further comprising the step of:

(h) receiving merchandising staff inputs to modify the price curve display by direct manipulation of the price curve display.

14. The process for modifying a price curve and approaching market equilibrium in an on-line buying co-op for a product of claim 13 further comprising the step of:

(i) translating the modified price curve to data with a data format for storage in the database.

15. The process for modifying a price curve and approaching market equilibrium in an on-line buying co-op for a product of claim 14 additionally comprising the step of:

(j) displaying a yield amount from sale of the product based on data from the database.

16. The process for modifying a price curve and approaching market equilibrium in an on-line buying co-op for a product of claim 15 additionally comprising the step of:

(k) modifying the displayed yield amount from sale of the product as the price curve is modified.

17. An article of manufacture, which comprises a computer readable medium having stored therein a computer program for modifying a price curve and approaching market equilibrium in an on-line buying co-op for a product, the computer program comprising:

(a) a first code segment which, when executed on a computer, defines an on-line buying co-op for a product;

(b) a second code segment which, when executed on a computer, stores in a storage device a database including at least price and quantity data for the product;

(c) a third code segment which, when executed on a computer, accepts inputs from prospective buyers in the form of offers for the product;

(d) a fourth code segment which, when executed on a computer, uses the inputs from the prospective buyers to modify the database; and (e) a fifth code segment which, when executed on a computer, receives merchandising staff inputs utilizing a market equilibrium manager to modify a price curve and approach market equilibrium for the product in the on-line buying co-op by utilizing the price and quantity data for the product in the database and the inputs from the prospective buyers.

18. The article of manufacture of claim 17 in which the first code segment includes code for receiving merchandising staff inputs for defining the buying co-op for the product.

19. The article of manufacture of claim 18 in which the first code segment is configured to define the buying co-op for the product by establishing a start time and an end time for the buying co-op, at least minimum quantities of the product offered and a starting price for the product.

20. The article of manufacture of claim 19 in which the computer program additionally comprises:

(f) a sixth code segment for manipulating and displaying data associated with the on-line buying co-op.

21. The article of manufacture of claim 20 in which the computer program additionally comprises:

(g) a seventh code segment for obtaining updated price data and the offers from the database and displaying the price curve and an offer histogram.

22. The article of manufacture of claim 21 in which the computer program further comprises:

(h) an eighth code segment for receiving merchandising staff inputs to modify the price curve display by direct manipulation of the price curve display.

23. The article of manufacture of claim 22 in which the computer program further comprises:

(i) a ninth code segment for translating the modified price curve to data with a data format for storage in the database.

24. The article of manufacture of claim 23 in which the computer program additionally comprises:

(j) a tenth code segment for displaying a yield amount from sale of the product based on data from the database.

25. The article of manufacture of claim 24 in which the computer program additionally comprises:

(k) an eleventh code segment for modifying the displayed yield amount from sale of the product as the price curve is modified.

* * * * *